(No Model.)

T. W. MORAN.
Velocipede.

No. 235,551. Patented Dec. 14, 1880.

Witnesses:
P. C. Dieterich
Wm. Supperman

Inventor,
Thos. W. Moran
per C. A. Watson & Co. Attorneys.

N. PETERS, PHOTO-LITHOGRAPHER, WASHINGTON, D. C.

UNITED STATES PATENT OFFICE.

THOMAS W. MORAN, OF LOUISVILLE, KENTUCKY.

VELOCIPEDE.

SPECIFICATION forming part of Letters Patent No. 235,551, dated December 14, 1880.

Application filed April 28, 1880. (No model.)

*To all whom it may concern:*

Be it known that I, THOMAS W. MORAN, of the city of Louisville, in the county of Jefferson and State of Kentucky, have invented certain new and useful Improvements in Bicycles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in bicycles, having for its object to improve the construction of the same; and it consists in the construction and arrangement of parts, as will be hereinafter more fully set forth.

Figure 1:
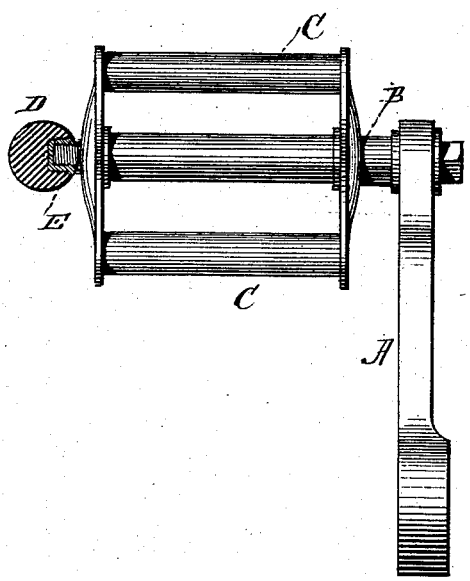
Figure 2:
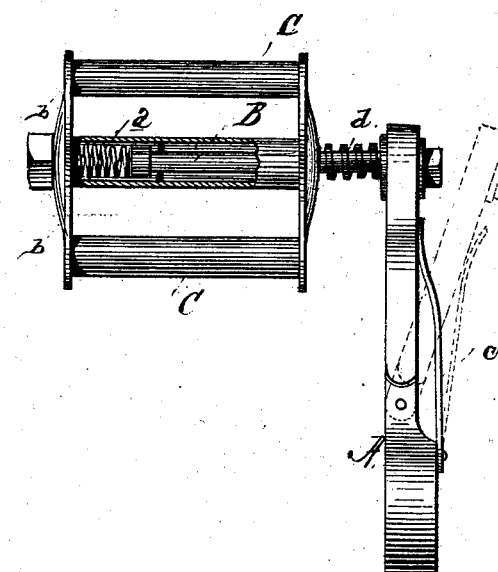
Figure 4:
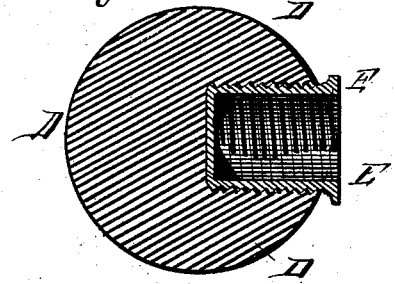
Figure 3:

In the annexed drawings, Figure 1 is a plan view; Fig. 2, a plan view, partly in section; Fig. 3, detail of the jointed crank, and Fig. 4 detail of the ball.

A represents the crank-shaft, attached to the main wheel of the bicycle in any suitable manner. B represents the pedal-pin, securely attached to the shaft A. C represents the pedal, arranged to turn upon the pedal-pin B.

D represents a rubber or other elastic ball, having a screw-threaded opening adapted to receive a metal cap, E. This cap E fits upon an extension of the pedal-pin B, and acts as a dust-cap. The cap E may be provided upon its interior with a screw-thread, as may also the end of the pin B, so that the cap may be screwed onto the said pin, or it may be attached to the pin in any other suitable manner. By this arrangement, in addition to excluding the dust, the pedal is prevented from breaking or bending by the capsizing of the bicycle, for the reason that the pedal being the part to strike the ground first the ball relieves the sudden jar occasioned by the fall. Instead of the ball D, the pedal-pin may extend two-thirds the distance inside of the pedal-bar, and a spring, *a*, arranged to bear against its head and the side bar, *b*, of the pedal, and a spring, *d*, interposed between the crank-shaft and the inner side of the pedal, as shown, which would also relieve the jar. The shaft A may also be jointed, as shown, and provided with a spring, *c*, so arranged as to hold the shaft in position when in use, and to bend or give sufficiently to relieve the jar in case the machine should fall. The ball D may also be attached to the handle, if desired.

Having thus fully described my invention, what I claim as new, and desire to secure by Letters Patent, is—

The arm A, pedal C, and pedal-pin B, in combination with an elastic cushion for relieving against jars, substantially in the manner and for the purpose set forth.

In testimony that I claim the foregoing as my own I have hereto affixed my signature in presence of two witnesses.

THOS. W. MORAN.

Witnesses:
 J. SHORT,
 B. F. D. FITCH.